Patented Dec. 13, 1932

1,891,198

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

METHOD OF MANUFACTURING MERCAPTOBENZOTHIAZOLE

No Drawing.   Application filed November 6, 1929.   Serial No. 405,284.

My invention relates to the manufacture of mercaptothiazoles and it has particular relation to the preparation of aryl mercaptothiazoles, such as mercaptobenzothiazoles and mercapto tolyl thiazoles.

One of the objects of the invention is to provide a method of preparing the above-designated compounds which is comparatively simple and which requires the use of relatively inexpensive basic ingredients.

Another object of the invention is to provide a method of preparing mercaptothiazoles which results in relatively high yields of especially pure compound.

Heretofore, mercaptothiazoles, notably such aryl mercaptothiazoles as mercaptobenzothiazole

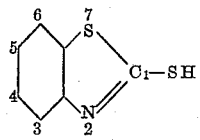

and methyl substituted mercaptobenzothiazole, have become of great commercial importance because of the development of uses thereof as accelerators of vulcanization of rubber compounds and as promoters in the froth flotation of metallic ores. These materials were originally prepared by the chemist Hoffman by subjecting amino thiophenol to the action of carbon bisulfide during a period of 24 hours or more. This method is objectionable because of the excessive amount of time required for the reaction and also because the yields obtained are relatively low and the product is obtained in a state of low purity. Since the time of Hoffman, many improvements have been made in the method of preparing the compound discovered by him. Probably one of the most successful methods heretofore employed has comprised subjecting diphenyl thiourea to the action of carbon bisulfide and sulphur. By a proper regulation of the conditions by which this reaction is effected, excellent yields of comparatively pure mercaptobenzothiazole or nucleus substituted derivatives thereof may be obtained.

My invention resides in the discovery that symmetrical dianilino methane constitutes an excellent basic material for the preparation of mercaptobenzothiazole. When this compound is employed as a starting material, it is subjected to the action of sulphur and carbon bisulfide, preferably in an autoclave, in substantially the same manner as employed in the manufacture of mercaptobenzothiazole from diphenyl thiourea. The method may be described in detail as follows:

Intermix one molecular quantity of symmetrical dianilino methane with four atoms of sulfur and one mol, or a slight excess (approximately 15% excess) of one mol of carbon bisulfide, and subject this mixture to a temperature of 110° to 130° C. for a period of 1½ hours in an autoclave. The temperature should then be quickly raised to approximately 230° to 260° C. and maintained at that value for a period of 2½ hours. During this time the pressure attained will range from 400 to 800 pounds per square inch. At the conclusion of the reaction, mercaptobenzothiazole will have been found to have been produced in yields of as high as 80% of the theoretical value. The mechanics of the reaction may be represented by the following equation:

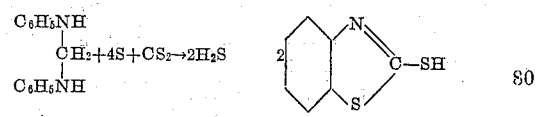

This material may readily be purified by steam distillation to remove unrelated materials. The residue should then be dissolved in alkali, filtered and reprecipitated by addition of dilute acid. The mother liquor may be removed from the precipitate by decantation, followed by washing with water and finally by drying. If the product is desired in a still greater degree of purity, it may be so obtained by recrystallizing the washed material from alcohol.

Analogous methods may be employed in the manufacture of methyl substituted mercaptobenzothiazoles. In such cases the only essential variations in the procedure consist in the substitution of the desired dianilino methane, examples of the latter being methyl and dimethyl dianilino methanes. As previously stated, the principal advantages of this invention lie in the relatively low cost of the basic ingredients, the excellent yields obtained, the simplicity of the process of manufacture and the high state of purity in which the product is obtained.

It is to be understood that the temperatures, pressures and times of heating given are only those for the preferred process. The reaction may be carried out with wide variations of the temperatures, pressures and time of heating.

Although I have described only the preferred embodiments of the invention, it will be apparent to those skilled in the art that it is not so limited but that various modifications may be made therein without departing from the spirit of the invention or from the scope of the appended claims.

What I claim is:

1. A method of manufacturing mercaptobenzothiazoles which comprises subjecting a material having the following structural formula:

in which R and $R_1$ are phenyl groups to the action of carbon bisulfide and sulphur under superatmospheric conditions of heat and pressure.

2. A method of manufacturing mercaptobenzothiazoles which comprises subjecting symmetrical dianilino methane to the action of carbon bisulfide and sulphur under superatmospheric conditions of heat and pressure.

3. A method of manufacturing 1-mercaptobenzothiazole which comprises subjecting symmetrical dianilino methane to the action of carbon bisulfide and sulphur at a temperature of approximately 230° to 260° C. for a period of approximately 2½ hours at superatmospheric pressures.

4. A method of manufacturing 1-mercaptobenzothiazole which comprises subjecting approximately molar quantities of symmetrical dianilino methane and carbon bisulfide together with approximately four atoms of sulphur to a temperature ranging from 110° C. to 260° C. and superatmospheric pressures for a period of approximately four hours.

5. A method of manufacturing aryl mercaptothiazoles which comprises reacting a material having the formula

in which R and $R_1$ are phenyl groups selected from a class consisting of phenyl, methyl phenyl and polymethyl phenyl groups, with carbon bisufide and sulfur under superatmospheric temperature conditions.

In witness whereof, I have hereunto signed my name at Akron, in the county of Summit and State of Ohio, U. S. A., this 4th day of November, 1929.

ALBERT M. CLIFFORD.